US005172033A

United States Patent [19]

Smits

[11] Patent Number: 5,172,033

[45] Date of Patent: Dec. 15, 1992

[54] DISCHARGE LAMP OPERATING INVERTER CIRCUIT WITH ELECTRIC DIMMER UTILIZING FREQUENCY CONTROL OF THE INVERTER

[75] Inventor: Egbertus H. M. Smits, Oss, Netherlands

[73] Assignee: U. S. Philips Corporation, New York, N.Y.

[21] Appl. No.: 749,027

[22] Filed: Aug. 23, 1991

[30] Foreign Application Priority Data

Sep. 14, 1990 [NL] Netherlands ........................ 9002023

[51] Int. Cl.5 ..................... H05B 37/02; H05B 41/16; H02M 7/5387

[52] U.S. Cl. ............................ 315/224; 315/DIG. 4; 315/274; 315/DIG. 7; 363/132

[58] Field of Search .................. 315/208, 209 R, 224, 315/268, 274, 326, 354, DIG. 4, DIG. 7; 363/132

[56] References Cited

U.S. PATENT DOCUMENTS 2,982,881 5/1961 Reich ........................... 315/DIG. 7
3,389,299 6/1968 Bell .............................. 315/DIG. 7
4,017,785 4/1977 Perper .......................... 315/DIG. 7
4,553,070 11/1985 Sairanen et al. ............... 315/209 R
4,712,045 12/1987 Van Meurs ................... 315/DIG. 4
4,935,672 6/1990 Lammers et al. .............. 315/200 R
4,983,887 1/1991 Nilssen .............................. 315/224
5,036,253 7/1991 Nilssen .............................. 315/224
5,084,653 1/1992 Nilssen ......................... 315/DIG. 7

FOREIGN PATENT DOCUMENTS 0294878 12/1988 European Pat. Off. ...... 315/DIG. 7
0340049 11/1989 European Pat. Off. ...... 315/DIG. 7

*Primary Examiner*—Eugene R. Laroche
*Assistant Examiner*—Michael B. Shingleton
*Attorney, Agent, or Firm*—Edward Blocker

[57] ABSTRACT

A circuit arrangement for operating a discharge lamp includes a DC-AC converter provided with a branch A having at least one switching element alternately conductive and non-conductive for generating a current of alternating polarity at a frequency f. A load branch B is coupled to the branch A and is provided with lamp connection terminals and with inductive means. A drive circuit E renders the switching element conducting and non-conducting at a frequency f. The drive circuit is provided with a branch D which includes a series circuit of further inductive means and capacitive means, and with a branch C including a variable impedance. The drive circuit is coupled to the inductive means in the load branch B, the branch D is coupled to the switching element in branch A, and the branch C is coupled to the further inductive means in branch D. Branch C also includes inductive means and the variable impedance is a variable resistor. The lamp thus can be dimmed over a wide range by a simple and inexpensive circuit.

11 Claims, 1 Drawing Sheet

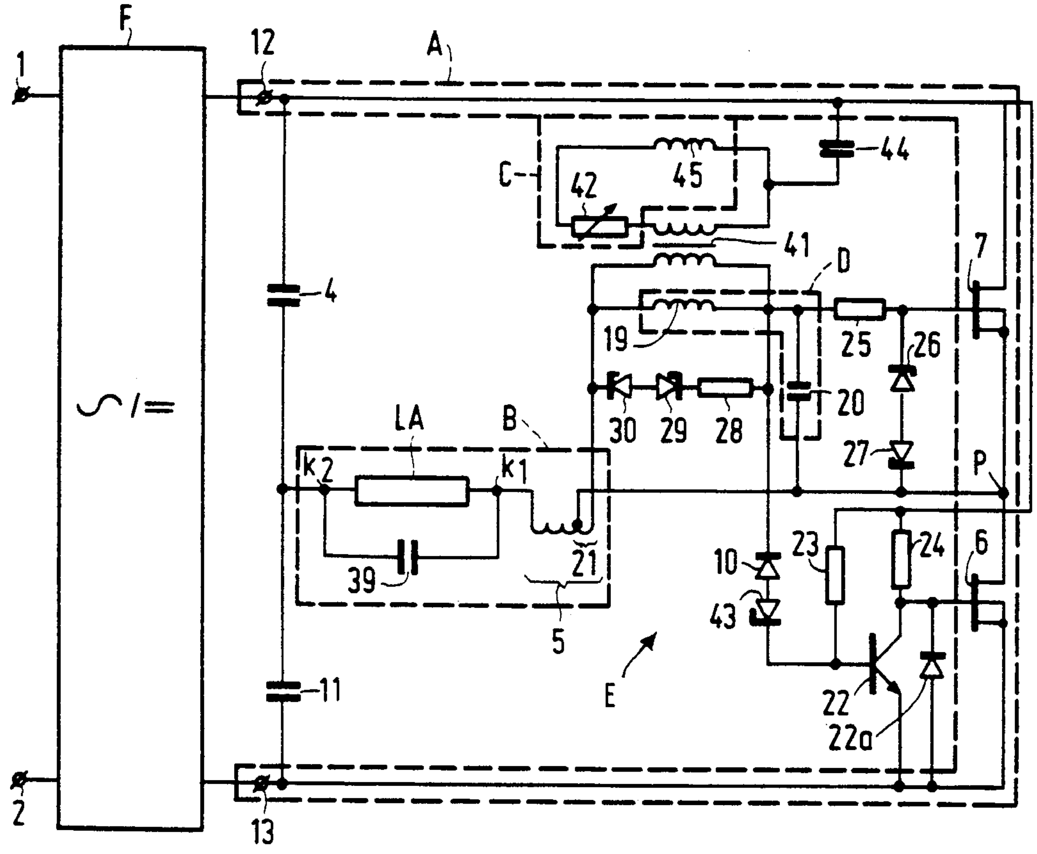
F
1
2
~/=
12
13
A
C
42
45
44
41
D
7
4
19
25
26
30
29
28
20
27
LA
B
k2
k1
P
21
39
5
10
43
23
24
6
11
22
22a
E

DISCHARGE LAMP OPERATING INVERTER CIRCUIT WITH ELECTRIC DIMMER UTILIZING FREQUENCY CONTROL OF THE INVERTER

BACKGROUND OF THE INVENTION

This invention relates to a circuit arrangement for operating a discharge lamp, comprising

- a DC-AC converter provided with a branch A′ comprising at least one switching element for generating a current of alternating polarity by being alternately conducting and non-conducting at a frequency f,
- a load branch B′ coupled to the branch A′ and provided with lamp connection terminals and with inductive means,
- a drive circuit E′ for rendering the switching element conducting and non-conducting at the frequency f, in which the drive circuit E′ is provided with a branch D′ which comprises a series circuit of further inductive means and capacitive means, and with a branch C′, which comprises a variable impedance, the drive circuit E being coupled to the inductive means in the load branch B′, the branch D′ being coupled to the switching element in branch A′, and the branch C′ being coupled to the further inductive means in branch D′.

Such a circuit arrangement is known from the Netherlands Patent Application 8701314, which corresponds to U.S. Pat. No. 4,935,672 (June 19, 1990). In the circuit arrangement described therein, branch A′ comprises two switching elements which are alternately conducting and non-conducting. Branch C′ shunts the further inductive means of the drive circuit.

By adjustment of the variable impedance, it is possible to set the frequency f of the current of alternating polarity and thus the power consumed by a lamp connected to the lamp connection terminals. It was found, however, that a comparatively small range of the lamp power can be controlled if branch C′ consists of a variable resistance, which has the advantage of being comparatively inexpensive. This is a drawback which is caused by the fact that a reduction of the power consumed by the lamp to below approximately 80% of the rated lamp power requires such a reduction of the resistance setting that the quantity of power dissipated in the resistance increases to such an extent that the drive circuit is no longer capable of rendering the switching elements of branch A′ conducting. The result is that the lamp extinguishes.

A variable inductance or a variable capacitance may also be chosen to form the variable impedance. A disadvantage of these options is that both a variable inductance and a variable capacitance are comparatively expensive components.

SUMMARY OF THE INVENTION

An object of the invention is to provide a circuit arrangement by which the power consumed by the lamp is adjustable over a wide range by means of comparatively inexpensive components.

A circuit arrangement of the kind described in the opening paragraph, according to the invention, is for this purpose characterized in that the variable impedance in branch C is a variable resistor and the branch C furthermore comprises inductive means. Since the inductive means form a part of branch C, the quantity of power taken up by the variable resistor is relatively small. It was found to be possible to adjust the power consumed by the lamp over a comparatively wide range as a result.

A particular embodiment of a circuit arrangement according to the invention is characterized in that the further inductive means are shunted by a primary winding of a transformer and branch C shunts a secondary winding of the transformer.

Since the variable resistor must be readily accessible in a practical embodiment of the circuit arrangement in order to be able to dim a lamp connected to the lamp connection terminals, it is difficult to screen off the variable resistor, which may give rise to radio interference. However, if the further inductive means and branch C are electrically separated by means of a transformer, the radio interference is effectively suppressed, even if the variable resistor is screened only to a small degree. Suppression of radio interference in this manner is of particular importance if branch A comprises two switching elements which are alternately conducting at a frequency f, and which comprises ends suitable for connection to a DC voltage source, while the branch D is connected to a common point of the two switching elements. Since branch D is connected to a common point of the two switching elements of branch A, the voltage across the further inductive means is superimposed on a square-wave voltage of frequency f and of an amplitude equal to a DC voltage supplied by the DC voltage source. If branch C shunts the further inductive means, the voltage across the variable resistor is also superimposed on this square-wave voltage. If, however, the further inductive means and branch C are coupled to one another by means of a transformer, radio interference as a result of this square-wave voltage is substantially eliminated.

A further particular embodiment of the design just described circuit arrangement according to the invention is characterized in that an end of the secondary winding of the transformer is connected to a pole of a DC-voltage source via a branch which comprises capacitive means.

A further reduction of the radio interference is achieved in this way.

BRIEF DESCRIPTION OF THE DRAWING

An embodiment of a circuit arrangement according to the invention will be described in more detail with reference to the accompanying drawing.

In the drawing, the figure shows the construction of an embodiment of a circuit arrangement according to the invention.

DESCRIPTION OF THE PREFERRED EMBODIMENTS

In the figure, reference numerals 1 and 2 denote input terminals suitable for connection to an AC voltage source. F is an AC-DC converter of which one output terminal is connected to input terminal 12 and of which a further output terminal is connected to input terminal 13. The series circuit of input terminal 12, switching elements 6 and 7, and input terminal 13 forms branch A. Branch A together with capacitors 4 and 11 forms a DC-AC converter. The series circuit of coil 5, lamp connection terminal K1, capacitor 39 and lamp connection terminal K2 constitutes the load branch B. In this embodiment, coil 5 forms the inductive means of load branch B. A lamp La can be connected to the lamp connection terminals. All further components of the circuit arrangement form part of the drive circuit: the drive circuit consists of coils 19 and 45, transformer 41, Zener diodes 26, 27, 29, 30 and 43, capacitors 44 and 20, resistors 23, 24, 25 and 28, variable resistor 42, switching element 22 and diodes 10 and 22*a*. Branch D in this embodiment is formed by the series circuit of coil 19 and capacitor 20. Coil 19 and capacitor 20 in this embodiment represent the further inductive means and the capacitive means of branch D, respectively. Coil 45 and variable resistor 42 together form branch C.

The drive circuit includes the following connections.

Ends of branch D are connected to a portion 21 of coil 5. Coil 19 is shunted by a primary winding of a transformer 41. A secondary winding of transformer 41 is shunted by the branch C. A first end of the secondary winding of transformer 41 is connected to input terminal 12 via a capacitor 44. Coil 19 is also shunted by a series circuit of zener diodes 29 and 30 and resistor 28 in order to limit the voltage across the coil 19. A first end of resistor 25 is connected to a control electrode of switching element 7. Capacitor 20 connects a further end of resistor 25 to a common point P of switching element 6 and switching element 7. The point P is connected to the control electrode of switching element 7 via a series circuit of zener diode 26 and zener diode 27. The object of this is to limit the voltage between the control electrode of switching element 7 and the point P. Input terminals 12 and 13 are shunted by a series circuit of a resistor 24 and a switching element 22. A common point of resistor 24 and switching element 22 is connected to a control electrode of the switching element 6. The control electrode of switching element 6 is connected to input terminal 13 by means of diode 22*a*. The control electrode of switching element 22 is connected to input terminal 12 by means of a resistor 23. The control electrode of switching element 22 is connected to a common point of coil 19 and capacitor 20 via a series circuit of a zener diode 43 and a diode 10.

The operation of the circuit arrangement shown in FIG. 1 is as follows.

When input terminals 1 and 2 are connected to the poles of an AC voltage source, a DC voltage is present between input terminals 12 and 13. In a stationary operating condition, the drive circuit renders the switching elements 6 and 7 alternately conducting at a frequency f. The result is that a substantially square-wave voltage is present between the ends of the load branch with a frequency f, while a current flows through the load branch whose polarity changes with the frequency f.

Since the portion 21 of coil 5 interconnects the ends of branch D, a periodic voltage of frequency f is present between the ends of branch D. Periodic voltages whose polarities alternate at the frequency f are also present between the ends of coil 19 and across capacitor 20. The periodic voltage across capacitor 20 renders switching element 7 alternately conducting and non-conducting at the frequency f. Switching element 6 is also made alternately conducting and non-conducting at the frequency f by the periodic voltage across capacitor 20 through the circuit elements 10, 43, 23, 24 and 22. Furthermore, switching element 7 is non-conducting when switching element 6 is conducting, and switching element 6 is non-conducting when switching element 7 is conducting.

Zener diode 43 serves to give the voltage across capacitor 20 a more sinusoidal shape. Capacitor 44 and transformer 41 serve to limit radio interference. When the resistance value of the variable resistor 42 in branch C is changed, the frequency f with which the current through the load branch changes polarity is also changed as a result. Since the lamp in the load branch is connected in series with coil 5, the power consumed by the lamp decreases with an increasing frequency f. An increase in the frequency f can be achieved in that the resistance value setting of the variable resistor 42 is reduced. Conversely, an increase in the resistance value setting corresponds to a decrease in the frequency f, so that the power consumed by the lamp increases.

In a concrete embodiment of the circuit arrangement shown in the figure, the self-inductance of coil 19 was 680 μH and the capacitance of capacitor 20 was 10 nF. The self-inductance of both the primary and the secondary winding of transformer 41 was 20 mH and the self-inductance of coil 45 was 100 μH. Through adjustment of the resistance value of the variable resistor 42 between 0 Ω and 2.2 KΩ, it was possible to vary the power consumed by a lamp connected to the lamp connection terminals between 9.2 W and 12.7 W. The luminous flux in this range varied from approximately 300 lumens to 1000 lumens.

I claim:

1. A circuit arrangement for operating a discharge lamp, comprising:

a DC-AC converter including a branch circuit A comprising at least one switching element which is alternately conductive and non-conductive at a frequency f thereby to generate a current of alternating polarity, a load branch circuit B coupled to the branch circuit A and provided with lamp connection terminals and with first inductive means, and a drive circuit E coupled to the one switching element to make it conductive and non-conductive at a frequency f, said drive circuit E including a branch circuit D which comprises a series circuit of further inductive means and capacitive means, and a branch circuit C which comprises a variable impedance, the drive circuit E being coupled to the first inductive means in the load branch circuit B, the branch circuit D being coupled to the one switching element in branch circuit A, and means coupling the branch circuit C to the further inductive means in branch circuit D, characterized in that the variable impedance in branch circuit C is a variable resistor and the branch circuit C furthermore comprises second inductive means inductively isolated from the first inductive means of load branch circuit B.

2. A circuit arrangement for operating a discharge lamp comprising:

A DC-AC converter including a branch circuit A comprising at least one switching element which is alternatively conductive and non-conductive at a frequency f thereby to generate a current of alternating polarity, a load circuit branch B coupled to the branch circuit A and provided with lamp connection terminals and with first inductive means, a drive circuit E for making the switching element conductive and non-conductive at a frequency f, said drive circuit E including a branch circuit D which comprises a series circuit of further inductive means and capacitive means, and a branch circuit C which comprises a variable impedance, the drive circuit E being coupled to the first inductive means in the load branch circuit B, the branch circuit D being coupled to the one switching element in branch circuit A, and the branch circuit C being coupled to the further inductive means in branch circuit D, characterized in that the variable impedance in branch circuit C is a variable resistor, the branch circuit C further comprises second inductive means, the further inductive means is shunted by a primary winding of a transformer, and branch circuit C shunts a secondary winding of the transformer.

3. A circuit arrangement as claimed in claim 2, where an end of the secondary winding of the transformer is connected to a terminal of a DC-voltage source via a second capacitive means.

4. A circuit arrangement as claimed in claim 2, wherein said coupling means couples branch circuit C to the further inductive means in branch circuit D in an electrically separated manner.

5. A circuit arrangement as claimed in claim 2, wherein said branch circuit D has first and second end terminals connected across a portion of said first inductive means of load branch circuit B thereby to provide the coupling of the drive circuit E to the first inductive means in the load branch circuit B.

6. A DC-AC converter for operating a discharge lamp comprising:

first and second input terminals for connection to a source of DC voltage, means connecting first and second controlled semiconductor switching elements in series across the input terminals and with a first junction point therebetween, means connecting first and second impedance elements in series across the input terminals and with a second junction point therebetween, a first inductive means, first means for coupling said first inductive means and a discharge lamp in series between said first and second junction points, a drive circuit coupled to respective control electrodes of said first and second semiconductor switching elements for alternately driving said semiconductor switching elements into conduction in mutually exclusive time intervals, said drive circuit comprising, a series circuit including a further inductive means and a capacitive means coupled to the control electrode of at least one of said semiconductor switching elements and a branch circuit comprising a variable resistor and a second inductive means, and second means for coupling said branch circuit to the further inductive means in an electrically isolated manner.

7. A DC-AC converter as claimed in claim 6, wherein said second coupling means comprises a transformer having a first winding connected across said further inductive means and a second winding connected to said variable resistor and to said second inductive means of the branch circuit.

8. A DC-AC converter as claimed in claim 6, wherein a third junction point between said further inductive means and said capacitive means is coupled to the control electrode of the other one of said semiconductor switching elements via a diode.

9. A DC-AC converter as claimed in claim 8, further comprising a zener diode connected in series with said diode.

10. A DC-AC converter as claimed in claim 6, further comprising a further series circuit including a resistor and first and second zener diodes and with said further series circuit connected in parallel with said further inductive means.

11. A circuit arrangement as claimed in claim 2, further comprising a further series circuit including a resistor and first and second zener diodes and with said further series circuit connected in parallel with said further inductive means.

* * * * *